Feb. 7, 1928.
P. W. FORSBERG
1,658,329
PROTECTIVE SYSTEM FOR ELECTRIC CIRCUITS
Filed Nov. 3, 1925
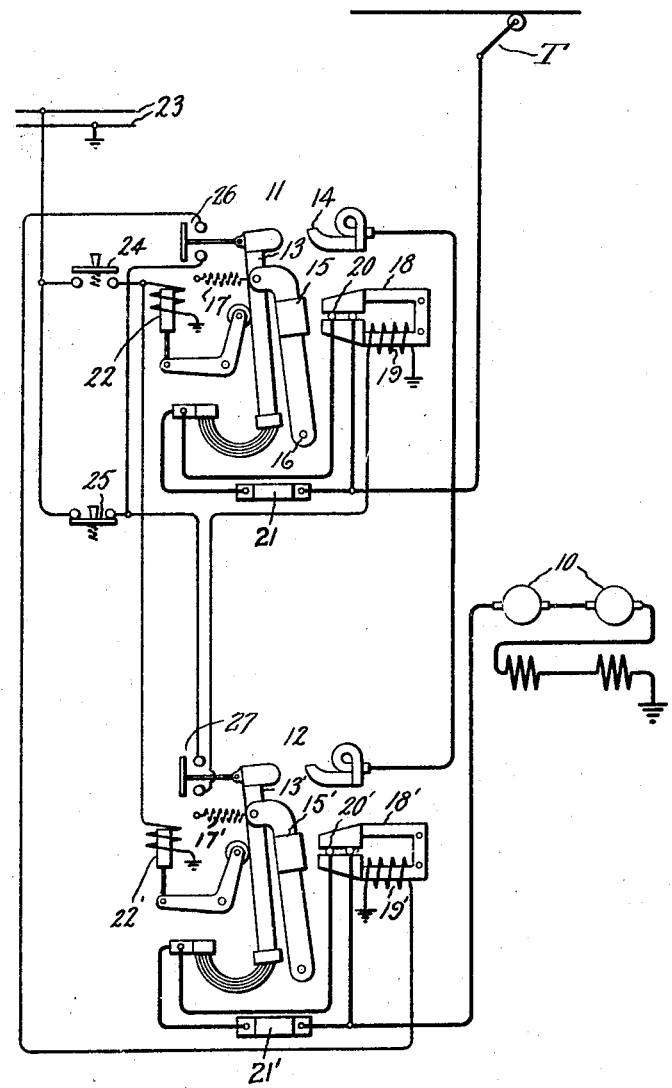
Inventor:
Peter W. Forsberg,
by *Alexander S. Lent*
His Attorney.

Patented Feb. 7, 1928.

1,658,329

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

PROTECTIVE SYSTEM FOR ELECTRIC CIRCUITS.

Application filed November 3, 1925. Serial No. 66,619.

This invention relates to protective systems for electric circuits, and more particularly to protective systems for electric circuits adapted to carry current in either direction, and has for its object the provision of a novel arrangement of electro-responsive protective apparatus for preventing the flow of currents of abnormal value in either direction in the circuit.

More specifically the invention provides an improved arrangement of electro-responsive circuit interrupting devices whereby a circuit of the above character may be interrupted positively and quickly upon the occurrence of an abnormal overload condition such, for example, as a short circuit or ground when the current is flowing in either direction in the circuit.

Although of general application, the present invention is particularly advantageous when applied to protect the power circuit of a high voltage electric locomotive having the driving motors arranged to be operated as load driven generators to regeneratively brake the load. Under motoring conditions the locomotive receives current from high voltage supply lines, while under regenerative braking conditions the current generated by the motors is returned to the line. It has been proposed heretofore to connect a circuit interrupter of the high speed type described and claimed in the Tritle Reissue Patent No. 15,441, in the power circuit of an electric locomotive, in order to afford protection from excessive rushes of current during motoring operation which may cause destructive arcing or flash-over of the driving motors. However, since the Tritle type of high speed circuit interrupter employs a movable circuit controlling member which is electromagnetically held in the circuit closing position, and is arranged to be released responsively only to predetermined conditions of current flow in one direction, and abnormal condition occurring during regenerative braking operation of the locomotive, such, for example as a short circuit or ground on the high voltage supply line may cause an equally disastrous arcing or flash-over of the motors against which no protection is afforded.

In accordance with my present invention this difficulty is overcome by means of a pair of electro-responsive circuit protecting devices, such as the Tritle high speed circuit interrupters previously referred to, which are connected in series in the circuit and arranged in such manner that one interrupter operates to open the circuit responsively only to excessive flow of motoring current in the circuit, while the other interrupter operates to open the circuit responsively only to excessive flow of regenerated current in the circuit.

The invention will be better understood from the following description taken in connection with the accompanying drawing, in which the single figure diagrammatically illustrates a protective system for the power circuit of an electric locomotive embodying the invention.

Referring to the drawing, it will be seen that the power circuit of an electric locomotive extending from the high voltage trolley T to ground and including the direct current driving motors 10 is under the control of a pair of electro-responsive circuit controlling devices 11 and 12 which are connected in series in the circuit. It will be understood that the usual form of switch mechanism employed for connecting the driving motors 10 of the locomotive in series and in parallel, as well as the ordinary form of speed controlling resistors for the motors, have been omitted from the drawing for the sake of simplicity therein. As shown, each of the electro-responsive circuit controlling devices 11 and 12 is a high speed trip free circuit interrupter of the type described and claimed in the co-pending application of John F. Tritle, Serial No. 511,100, filed October 28, 1921, and assigned to the same assignee as my present invention. As more fully set forth in the above Tritle application, the principal parts of the circuit interrupter 11, as illustrated in the drawing, comprise the movable switch arm 13, which cooperates with the stationary contact 14 to open and close the power circuit of the locomotive. Switch arm 13, is pivoted intermediate its ends in suitable bearings carried at one end of the movable magnetic member 15 which in turn is mounted to rotate about the stationary pin 16. A common biasing spring 17 for both magnetic member 15 and switch arm 13 is arranged to bias the switch arm 13 to the circuit-opening position when the movable magnetic member 15 is held in the attracted position by the electromagnet 18. The electromagnet 18 is provided with a shunt holding winding 19 for normally exerting sufficient magnetic attraction on the movable magnetic member 15 when the latter is operated into attractive relation with the poles of the electromagnet to overcome the opening strain of biasing spring 17. A buckling bar or series winding 20 is interposed in the air gap between the poles of holding electromagnet 18, as described and broadly claimed in the Tritle Reissue Patent No. 15,441, previously mentioned, and as more particularly described and claimed in the Patent No. 1,506,483. In the particular circuit interrupter illustrated the bucking bar or series winding 20 is connected to be energized responsively to the current in the power circuit of the electric locomotive, and is shunted by an inductive shunt 21 having greater inductance than the inductance of the bucking bar or series winding 20, in order to effect opening of the interrupter at a lower value of current upon a rapid increase or rush of current. The circuit interrupter 11 is operated to the closing position by means of an electromagnetic closing mechanism 22 which is arranged to be energized from the low voltage supply lines 23 under the control of the normally open push button 24. As illustrated, the holding winding 19 is connected to receive current from the low voltage supply lines 23 under the control of the normally closed push button 25.

The circuit interrupter 12 having the movable circuit controlling member 13', movable magnetic member 15', the holding electromagnet 18' and the other elements constructed and arranged in exactly the same manner as described in connection with interrupter 11 is connected so that the circuit controlling member 13' is in series with the circuit controlling member 13 of interrupter 11 in the power circuit of the locomotive and the bucking bar or series winding 20' likewise is connected to be energized responsively to the current in the power circuit and is shunted by the inductive shunt 21'. However, it will be observed that the holding winding 19' is arranged to be energized from the low voltage supply lines 23 in a reverse direction from the holding winding 19 of the interrupter 11. By this arrangement the magnetic reaction of the bucking bar or series winding 20' upon the magnetic influence of the holding winding 19' of interrupter 12 is reversed from the magnetic influence of the bucking bar or series winding 20 upon the holding winding 19 of interrupter 11. In this way the interrupter 11 is arranged to be operated to the circuit opening position responsively only to predetermined conditions of flow in the power circuit of the locomotive in one direction, while the interrupter 12 is arranged to operate to the circuit opening position responsively only to predetermined conditions of flow of current in the power circuit of the locomotive in the reverse direction.

Circuit interrupters 11 and 12 are electrically interlocked so that the automatic opening of either interrupter causes the subsequent opening of the other interrupter. This is accomplished by means of the auxiliary switches 26 and 27, the former of which is mechanically connected to the movable switch arm 13 of the interrupter 11 and is arranged to control the energizing circuit of the holding winding 19' of the interrupter 12, while the auxiliary switch 27 is actuated by the swtch member 13' of interrupter 12 and is connected to control the energizing circuit of the holding winding 19 of interrupter 11.

The operation of the protective system illustrated is as follows: With the high voltage trolley T and the low voltage supply lines 23 energized from suitable sources, the interrupters 11 and 12 may be closed to complete the power circuit of the locomotive by closure of the normally open control switch 24. This simultaneously energizes the closing mechanisms 22 and 22' and the resulting operation thereof moves the respective magnetic members 15 and 15' of the interrupters 11 and 12 into attractive relation with the holding electromagnets 18 and 18'. Upon the closure of the auxiliary switches 26 and 27 the holding windings 19 and 19' are energized to electromagnetically hold the magnetic members 15 and 15' in the attractive position. Switch 24 now may be released to permit the closure of the circuit controlling member 13 and 13' by the biasing springs 17 and 17' respectively.

With the interrupters 11 and 12 electromagnetically held in the closed position the driving motors 10 of the locomotive may be controlled by a suitable switch mechanism, not shown in the drawing, to effect either motoring or regenerative braking operation of the locomotive. During motoring operation the interrupter 11 affords automatic protection to the power circuit of the locomotive against excessive rushes of overload current which might cause destructive arcing or flash-over of the motors 10. Thus upon the occurrence of a rapidly increasing overload current during motoring operation the inductive shunt 21 forces an increased proportion of the current into the buckling bar or series winding 20 and the magnetic reaction of the buckling bar or series winding 20 upon the flux set up in the holding electromagnet 18 by the holding winding 19 effects the release of the magnet 15 and thereby permits the biasing spring 17 quickly to open the movable contact arm 13. Under these conditions, however, the magnetic reaction of the buckling bar or series winding 20' upon the flux in the holding winding 18' in interrupter 12 will not effect the release of the magnetic member 15' due to the fact that holding winding 19' is energized in the reverse direction from the holding winding 19. Upon the opening of interrupter 11 the circuit of holding winding 19' is interrupted by the auxiliary switch mechanism 26 and the resulting deenergization of the holding winding 19 permits the interrupter 12 to open in accordance with its bias. Reclosure of the interrupters 11 and 12 is accomplished in the manner previously described.

During regenerative braking operation the interrupter 12 affords protection to the power circuit of the locomotive against excessive rushes of overload current since under regenerative braking conditions current flows in the power circuit in the reverse direction. In this case the inductive shunt 21' forces an increased proportion of the current into the bucking bar or series winding 20' and the magnetic reaction of the bucking bar or series winding 20' upon the flux in the holding electromagnet 18' is in the proper relation to effect the release of the magnetic member 15' and the consequent opening of the interrupter 12. The interrupter 11 is unresponsive to excessive overloads which occur during regenerative braking operation and is opened only when the energizing circuit of holding winding 19 is interrupted through operation of the auxiliary switch 27 upon opening of interrupter 12. Thus it will be seen that by arranging the interrupter 11 to operate responsively to a rapid increase in the flow of current in the circuit in one direction and the interrupter 12 to operate responsively to a rapid increase in the flow of current in the other direction, the power circuit of the locomotive is protected against excessive overloads during both motoring and regenerative braking operation.

What I claim as new and desire to secure by Letters Patent of the United States, is:—

1. A protective system for an electric circuit arranged to carry current in either direction comprising a pair of independently operable high speed electro-responsive circuit interrupters connected in series relation in the circuit and each arranged to operate separately to open the circuit responsively to a rapid increase in the flow of current in the circuit in a different direction.

2. A protective system for an electric circuit arranged to carry current in either direction comprising an electro-responsive circuit interrupter connected in the circuit and arranged to operate to open the circuit responsively only to flow of current in the circuit in one direction, and an independently operable electro-responsive circuit interrupter connected in the controlled circuit in series with the first device and arranged to operate to open the circuit responsively only to flow of current in the circuit in the reverse direction; and means whereby the operation of one of said devices causes the subsequent operation of the other device.

3. A protective system for an electric circuit arranged to carry current in either direction comprising a high speed electro-responsive circuit interrupter having a movable switch member connected in the controlled circuit and arranged to be electromagnetically held in the circuit-closing position and operated to open the circuit responsively to a flow of current of predetermined value in one direction and to be operated to open the circuit at a lower value of current upon a rapid increase in the flow of current in the circuit in said one direction; and a second high speed electro-responsive circuit interrupter having a switch member connected in the controlled circuit in series with said first member and arranged to be electromagnetically held in the circuit-closing position and operated to open the circuit responsively to a flow of current of predetermined value in the reverse direction and to be operated to open the circuit at a lower value of current upon a rapid increase in the flow of current in the circuit in said reverse direction.

4. A protective system for an electric circuit arranged to carry current in either direction comprising a high speed circuit interrupter having a movable switch member connected in the controlled circuit and biased to the circuit opening position, the said switch member being arranged to be electromagnetically held in the circuit closing position under the joint magnetic influence of a holding winding and a conductor associated therewith and connected to be energized responsively to the current in the controlled circuit to effect the quick release of the switch member responsively only to predetermined conditions of current flow in the circuit in one direction, and a second high speed circuit interrupter having an independently movable switch member connected in the controlled circuit in series with the said first movable switch member of the first interrupter and biased to the circuit opening position, the said second switch member being arranged to be electromagnetically held in the circuit closing position under the joint magnetic influence of a holding winding and a conductor associated therewith and connected to be energized responsively to the current in the controlled circuit to effect the quick release of the said second independently movable switch member responsively only to predetermined conditions of current flow in the circuit in the reverse direction.

5. A protective system for an electric circuit arranged to carry current in either direction comprising a high speed circuit interrupter having a movable switch member connected in the controlled circuit and biased to the circuit opening position, the said switch member being arranged to be electromagnetically held in the circuit closing position under the joint magnetic influence of a holding winding and a conductor associated therewith and connected to be energized responsively to the current in the controlled circuit to effect the quick release of the switch member responsively only to predetermined conditions of current flow in the circuit in one direction, and a second high speed circuit interrupter having a movable switch member connected in the controlled circuit in series with the said movable switch member of the first interrupter and biased to the circuit opening position and arranged to be electromagnetically held in the circuit closing position under the joint magnetic influence of a holding winding and a conductor associated therewith and connected to be energized responsively to the current in the controlled circuit to effect the quick release of the said second movable switch member responsively only to predetermined conditions of current flow in the circuit in the reverse direction, and switch mechanism, and connections whereby the operation of the switch member of either interrupter to the circuit opening position interrupts the energizing circuit of the holding winding of the other interrupter to release the corresponding switch member to operate to the circuit opening position in accordance with its bias.

In witness whereof, I have hereunto set my hand this 20th day of October, 1925.

PETER W. FORSBERG.

CERTIFICATE OF CORRECTION.

Patent No. 1,658,329.  Granted February 7, 1928, to

PETER W. FORSBERG.

It is hereby certified that error appears in the printed specification of the above numbered patent requiring correction as follows: Page 2, lines 7, 121, 123 and 130, for the word "buckling" read "bucking"; and that the said Letters Patent should be read with this correction therein that the same may conform to the record of the case in the Patent Office.

Signed and sealed this 6th day of March, A. D. 1928.

Seal.

M. J. Moore,
Acting Commissioner of Patents.